United States Patent [19]

Sommer

[11] Patent Number: 4,830,136

[45] Date of Patent: May 16, 1989

[54] FOUR-WHEEL DRIVE MOTOR VEHICLE

[75] Inventor: Hans D. Sommer, Graz, Austria

[73] Assignee: Steyr-Daimler-Puch Aktiengesellschaft, Vienna, Austria

[21] Appl. No.: 68,952

[22] Filed: Jul. 1, 1987

[30] Foreign Application Priority Data

Jul. 1, 1986 [AT] Austria .................................. 1771/86

[51] Int. Cl.$^4$ ............................................. B60K 17/34
[52] U.S. Cl. ..................... 180/233; 180/197; 180/247
[58] Field of Search ............... 180/197, 243, 247, 248, 180/249; 303/95, 98, 100, 102, 103; 340/52 R; 361/238, 242; 192/13

[56] References Cited

U.S. PATENT DOCUMENTS

| | | | |
|---|---|---|---|
| 3,967,862 | 7/1976 | Hunter et al. | 180/197 X |
| 4,125,295 | 11/1978 | Ruhnau et al. | 180/197 X |
| 4,417,641 | 11/1983 | Kageyama | 180/247 |
| 4,419,654 | 12/1983 | Funk | 180/197 X |
| 4,480,502 | 11/1984 | Nembach | 180/243 X |
| 4,484,653 | 11/1984 | Horikoshi et al. | 180/197 X |
| 4,511,014 | 4/1985 | Makita | 180/197 X |
| 4,521,856 | 6/1985 | Phelps et al. | 180/197 X |
| 4,552,241 | 11/1985 | Suzuki . | |
| 4,556,134 | 12/1985 | Takano | 180/233 |
| 4,562,541 | 12/1985 | Sakakiyama | 180/197 X |
| 4,620,420 | 11/1986 | Gloss et al. | 180/197 X |
| 4,625,824 | 12/1986 | Leiber | 180/197 |
| 4,714,127 | 12/1987 | Fanti et al. | 180/233 |
| 4,732,248 | 3/1988 | Yoshimura et al. | 192/0.055 |

FOREIGN PATENT DOCUMENTS

| | | |
|---|---|---|
| 0043237 | 6/1982 | European Pat. Off. . |
| 0212721 | 4/1987 | European Pat. Off. . |
| 1935596 | 2/1971 | Fed. Rep. of Germany ...... 180/197 |
| 3302936 | 8/1983 | Fed. Rep. of Germany . |
| 3427725 | 8/1985 | Fed. Rep. of Germany . |
| 3505455 | 8/1986 | Fed. Rep. of Germany . |
| 2104178 | 3/1983 | United Kingdom . |
| 2132303 | 7/1984 | United Kingdom . |
| 2167718 | 6/1986 | United Kingdom . |
| 2172863 | 10/1986 | United Kingdom . |

Primary Examiner—David M. Mitchell
Attorney, Agent, or Firm—Marmorek, Guttman & Rubenstein

[57] ABSTRACT

A four-wheel drive of a motor vehicle is arranged to effect automatic changes between a two-wheel drive mode and a four-wheel drive mode in dependence on the slip of two wheels (5) which are permanently driven. A frequent change from the four-wheel drive mode to the two-wheel drive mode for a speed comparison is to be avoided in a four-wheel drive which has a relatively simple structure. Two sensors (12) are associated with the two permanently driven wheels (5) and the output signals of said sensors are delivered to a computer (11), which determines for consecutive units of time the occurrences of the speed difference between said two wheels in excess of a predetermined threshold value and generates a distribution curve of said occurrences in consecutive units of time. That distribution curve is compared in the computer with a corresponding stored limiting curve, which is applicable to a minimum coefficient of road friction. The computer (11) controls a final control element (10) for effecting a change to the four-wheel drive mode when said distribution curve exceeds said limiting curve.

19 Claims, 1 Drawing Sheet

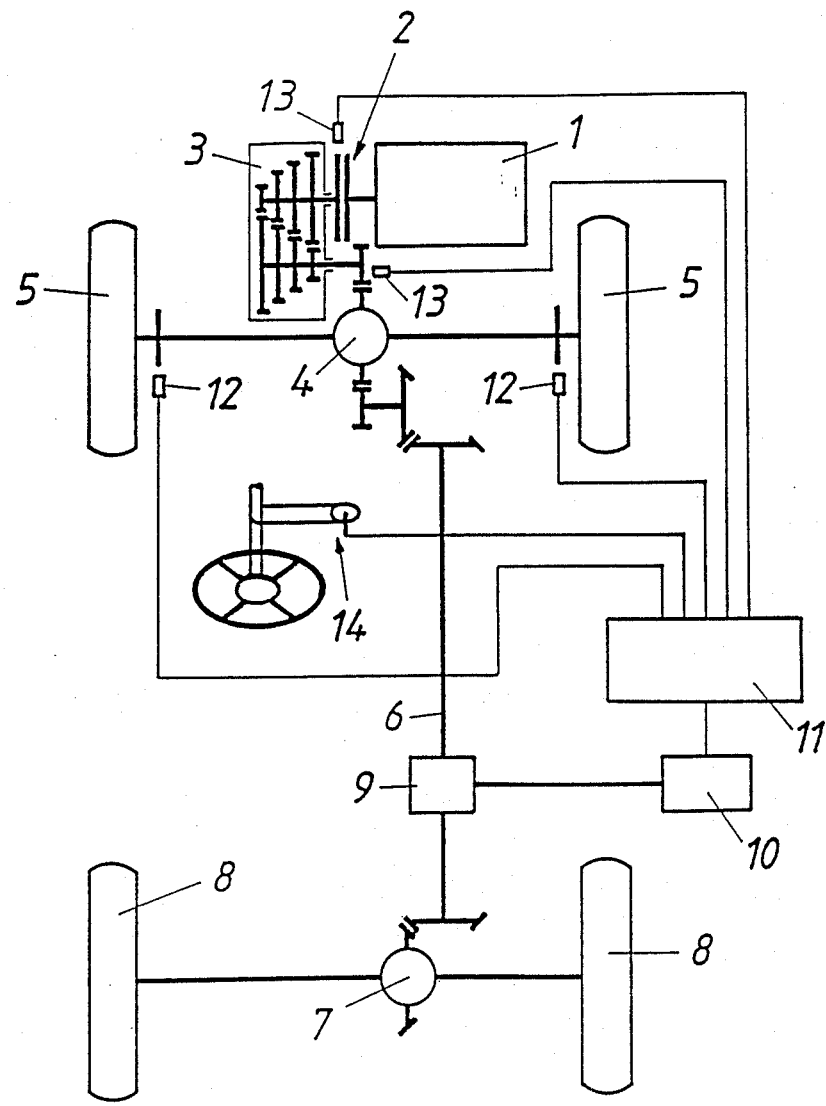

FOUR-WHEEL DRIVE MOTOR VEHICLE

BACKGROUND OF THE INVENTION

1. Field of the Invention

This invention relates to a four-wheel drive motor vehicle comprising means for effecting an automatic change from two-wheel drive mode to a four-wheel drive mode in dependence on the slip of the two permanently driven wheels.

2. Description of the Prior Art

It is already known to measure the slip of the two permanently driven wheels of a four-wheel driven motor vehicle in that the speeds of said two permanently driven wheels and of the optionally drivable wheels are compared and the four-wheel drive modes is selected in response to a high slip of the permenently driven wheels (FISITA Belgrade, June 2 to 6, 1986, Proceedings, Volume 2, pages 277 to 283). When the four-wheel drive mode has been selected, the optionally drivable wheels must be mechanically disconnected from the power transmission after a short interval of time so that the speeds of the permanently driven wheels and of the optionally drivable wheels can again be compared in order to ascertain whether or not the slip of the permanently driven wheels is still so large that a four-wheel drive is justified. Unless that mechanical disconnection is performed, there will be no speed difference between the permanently driven wheels and the optionally drivable wheels unless the power train leading to the optionally drivable wheels incorporate a differential or a liquid friction coupling. The clutch for connecting and disconnecting the optionally drivable wheels must meet special requirements and a differential will increase the structural expenditure involved and is not justified in some applications.

SUMMARY OF THE INVENTION

It is an object of the invention to eliminate the disadvantages stated above and so to improve a four-wheel drive motor vehicle which is of the kind described first hereinbefore that a need for a frequent change between a four-wheel drive mode and a two-wheel drive mode for measuring purposes and for a comparison of speeds will no longer be required, this is to be accomplished with structurally simple means.

That object is accomplished in accordance with the invention in that two sensors are respectively associated with the two permanently driven wheels and are used to detect the speed differences between said wheels and to deliver signals corresponding said speed differences to a computer, in which the occurrences of said speed differences in excess of a predetermined threshold value are derived from said signals, a distribution curve of said occurrences in consecutive units of time is generated and is compared with a limiting curve which is stored in said computer and applicable to a minimum coefficient of road friction, and a final control element is provided for selecting a four-wheel drive mode when the comparison indicates that the distribution curve exceeds the limiting curve.

The invention is based on the recognition that speed differences between the two permanently driven wheels will occur during any travel of the vehicle and that such speed differences will occur at a much lower frequency on a dry road having a high coefficient of road friction than, e.g., on a wet road having a low coefficient of friction resulting in a larger slip. The limiting curve stored in the computer is an empirically determined distribution curve for travel conditions which involve a limiting slip which just permits the vehicle to be driven in the two-wheel mode. But when the speed differences occur at a higher frequency, which is higher than that which is predetermined by the limiting curve which has been stored in the computer, this will indicate a high degree of slip is occurring at the two permanently driven wheels so that the four-wheel drive mode must be selected. As it is no longer necessary to compare the speed of the permanently driven wheels, on the one hand, and the speed of the optionally driven wheels, on the other hand, the four-wheel drive mode need not be interrupted frequently for a measurement. If the frequency of such excessive speed differences decreases below the values which are indicated by the limiting curve, the two-wheel drive mode will be restored because a decrease of said frequency will indicate a lower slip.

It will be understood that the travel conditions in the four-wheel drive mode will differ from those in the two-wheel drive mode and that this should be taken into account in the limiting curve which is used. For that purpose a second limiting curve is stored in the computer and is used for the change from the four-wheel drive mode to the two-wheel drive mode. That second limiting curve represents those values which must exceed the frequency of the detected excessive speed differences when a change from the four-wheel drive mode to the two-wheel drive mode is to be effected.

The motor vehicle may be so designed that the stored limiting curve or curves do not represent optimum values for an operation of the motor vehicle at all gear stages of the shiftable transmission of the motor vehicle. For this reason it may be desirable to store two limiting curves for each gear stage of the shiftable transmission in the computer and to select said limiting curves, for instance, in response to a comparison of the engine speed and the output speed of the transmission.

The two wheels of an axle will obviously rotate at different speeds when the vehicle is cornering and the resulting speed differences may not be due to different coefficients of friction. Particularly during a travel around long road bends that fact can be taken into account in that a sensor for detecting the steering angle is connected to the computer and the limiting curves are arranged to be varied in dependence on the steering angle detected by said sensor. Alternatively the final control element may maintain its state regardless of the state of the computer when the steering angle exceeds a predetermined upper limit.

BRIEF DESCRIPTION OF THE DRAWING

The drawing is a diagrammatic representation of an illustrative embodiment of a four-wheel drive of a motor vehicle in accordance with the invention.

The two front wheels 5 of a motor vehicle are permanently driven by an engine 1 through the intermediary of a clutch 2, a speed-changing transmission 3 and a differential 4. A power train 6 leads from the differential 4 to the interaxle differential 7 for driving the rear wheels 8. The power train 6 incorporates an interaxle clutch 9 for effecting a change between the two-wheel drive mode and the four-wheel drive mode under the control of a clutch actuator 10, which constitutes a final control element and is controlled by a computer 11, which receives various output signals generated by sensors. Two sensors 12 are associated with the two front wheels 5, respectively, and detect the speeds of said front wheels 5 and deliver corresponding signals to the computer 11, in which the occurrences of a difference between said two speeds in excess of a predetermined threshold value in consecutive units of time are detected and a corresponding distribution curve is generated. The gear stage which has been selected in the shiftable transmission 3 is detected by two sensors 13 for detecting the engine speed and the output speed of the transmission 3, and by a comparator, which is incorporated in the computer 11 and compares the speeds detected by the sensors 13. A sensor 14 for detecting the steering angle is also connected to the computer.

The computer may be designed to generate the above-mentioned distribution curve in dependence on the numbers of the occurrences of said excessive speed differences in consecutive units of time or in dependence on the numbers of consecutive units of time in which such excessive speed differences are detected.

I claim:
1. A motor vehicle comprising
first and second axles,
first and second permanently driven wheels mounted on said first axle,
third and fourth optionally driven wheels mounted on said second axle,
a four-wheel drive mode for selectively driving only said first and second wheels in a two-wheel drive mode and said first, second, third and fourth wheels in a four-wheel drive mode,
means for detecting intra-axle speed differences between said first and second permanently driven wheels on said first axle and for generating a signal representative of said speed differences,
means for determining each occurrence when said intra-axle speed difference exceeds a predetermined threshold value,
means for determining the number of such occurrences in a plurality of successive time units and for generating a distribution curve,
means for storing a first set of predetermined values representing a first limiting curve, and
means for comparing said number of occurrences from said distribution curve with said first set of stored predetermined values representing said first limiting curve, and
mode-selecting means for switching said vehicle from said two-wheel to said four-wheel drive mode and for continuously maintaining said vehicle in said four-wheel drive mode when said distribution curve exceeds said first limiting curve, and for switching said vehicle from said four-wheel to said two-wheel drive mode and for continuously maintaining said vehicle in said two wheel drive mode when said first limiting curve exceeds said distribution curve.

2. The vehicle of claim 1 wherein said first limiting curve represents a first set of predetermined values for a predetermined coefficient of road friction.

3. The vehicle of claim 1 comprising
means for storing a second set of predetermined values representing a second limiting curve, and
means for comparing said number of occurrences from said distribution curve with said second set of stored predetermined values representing said second limiting curve,
said mode-selecting means selectively said two-wheel drive mode when said second limiting curve exceeds said distribution curve.

4. The vehicle of claim 3 comprising
a shiftable transmission which is operable in a plurality of selectable gear stages,
means for storing first and second sets of predetermined values representing first and second limiting curves for each selectable gear stage, and
means for comparing said number of occurrences from said distribution curve with said first and second sets of stored predetermined values representing first and second limiting curves for each gear stage,
said mode-selecting means selecting said two-wheel and four-wheel drive modes based upon said comparison for each gear stage.

5. The vehicle of claim 4 further comprising means for detecting a selected gear stage and for generating a signal representative of said selected gear stage, said mode-selecting means being responsive to said signal representing said selected gear stage.

6. The vehicle of claim 3 further comprising means for detecting a steering angle of said vehicle and for generating a signal representative of said steering angle, said mode-selecting means being responsive to said signal representing said steering angle.

7. The vehicle of claim 1 comprising
a shiftable transmission which is operable in a plurality of selectable gear stages,
means for storing a first set of predetermined values representing a first limiting curve for each selected gear stage, and
means for comparing said number of occurrences from said distribution curve with said first set of stored predetermined values representing said first limiting curve for each gear stage,
said mode-selecting means selecting said four-wheel drive when said distribution curve exceeds said first limiting curve for each gear stage.

8. The vehicle of claim 7 further comprising means for detecting a selected gear stage and for generating a signal representative of said selected gear stage, said mode-selecting means being responsive to said signal representing said selected gear stage.

9. The vehicle of claim 1 further comprising means for detecting a steering angle of said vehicle and for generating a signal representative of said steering angle, said mode-selecting means being responsive to said signal representing said steering angle.

10. The vehicle of claim 1 further comprising means for detecting a steering angle of said vehicle and for generating a signal representative of said steering angle, said mode-selecting means maintaining said vehicle in selected two-wheel and four-wheel drive modes when said steering angle signal exceeds a predetermined upper limit.

11. The vehicle of claim 1 wherein said means for generating a distribution curve generates said distribution curve as a function of said number of occurrences detected in successive units of time.

12. The vehicle of claim 1 wherein said means for generating said distribution curve generates said distribution curve as a function of the number of successive units of time in which said occurrences are determined.

13. A motor vehicle comprising
first and second axles, first and second permanently driven wheels mounted on said first axle, third and fourth optionally driven wheels mounted on said second axle, a four-wheel drive for selectively driving only said first and second wheels in a two-wheel drive mode and said first, second, third and fourth wheels in a four-wheel drive mode, means for detecting intra-axle speed differences between said first and second permanently driven wheels on said first axle and for generating a signal representative of said speed differences, means for determining each occurrence when said intra-axle speed difference exceeds a predetermined threshold value, means for determining the number of such occurrences in a plurality of successive time units and for generating a distribution curve, means for storing first and second sets of predetermined values representing first and second limiting curves respectively, means for comparing said number of occurrences from said distribution curve with said first and second sets of stored predetermined values representing said first and second limiting curves, and mode-selecting means for switching said vehicle from said two-wheel to said four-wheel drive mode when said distribution curve exceeds said first limiting curve, and for switching said vehicle from said four-wheel to said two-wheel drive mode when said second limiting curve exceeds said distribution curve.

14. The motor vehicle of claim 13 wherein said first and second sets of predetermined values are equal.

15. A motor vehicle comprising
first and second axles,
first and second permanently driven wheels mounted on said first axle,
third and fourth optionally driven wheels mounted on said second axle,
a four-wheel drive for selectively driving only said first and second wheels in a two-wheel drive mode, and said first, second, third and fourth wheels in a four-wheel drive mode,
means for detecting intra-angle speed differences between said first and second permanently driven wheels on said first axle and for generating a signal representative of said speed differences,
mode-selecting means responsive to said signal for causing said four-wheel drive to selectively operate said motor vehicle in said two-wheel and said four-wheel drive modes,
a shiftable transmission which is operable in a plurality of selectable gear stages,
means for determining each occurrence when said intra-axle speed difference exceeds a predetermined threshold value,
means for determining the number of such occurrences in a plurality of successive time units and for generating a distribution curve,
means for storing first and second sets of predetermined values representing first and second limiting curves for each selectable gear stage, and
means for comparing said number of occurrences from said distribution curve with said first and second sets of stored predetermined values representing first and second limiting curves for each gear stage,
said mode-selecting means selecting said two-wheel and four-wheel drive modes based upon said comparison for each gear stage.

16. The vehicle of claim 15 further comprising means for detecting a selected gear stage and for generating a signal representative of said selected gear stage, said mode-selecting means being responsive to said signal representing said selected gear stage.

17. The vehicle of claim 15 further comprising means for detecting a steering angle of said vehicle and for generating a signal representative of said steering angle, said mode-selecting means being responsive to said signal representing said steering angle.

18. A motor vehicle comprising
first and second axles,
first and second permanently driven wheels mounted on said first axle,
third and fourth optionally driven wheels mounted on said axle,
a four-wheel drive for selectively driving only said first and second wheels in a two-wheel drive mode, and said first, second, third and fourth wheels in a four-wheel drive mode,
means for detecting intra-axle speed differences between said first and second permanently driven wheels on said first axle and for generating a signal representative of said speed differences,
mode-selecting means responsive to said signal for causing said four-wheel drive to selectively operate said motor vehicle in said two-wheel and said four-wheel drive modes,
means for determining each occurrence when said intra-axle speed difference exceeds a predetermined threshold value,
means for determining the number of such occurrences in a plurality of successive time units and for generating a distribution curve,
a shiftable transmission which is operable in a plurality of selectable gear stages,
means for storing a first set of predetermined values representing a first limiting curve for each selected gear stage, and
means for comparing said number of occurrences from said distribution curve with said first set of stored predetermined values representing said first limiting curve for each gear stage,
said mode-selecting means selectively said four-wheel drive mode when said distribution curve exceeds said first limiting curve for each gear stage.

19. The vehicle of claim 18 further comprising means for detecting a selected gear stage and for generating a signal representative of said selected gear stage, said mode-selecting means being responsive to said signal representing said selected gear stage.

* * * * *